United States Patent [19]

Elhaus

[11] Patent Number: 5,062,336
[45] Date of Patent: Nov. 5, 1991

[54] HOT SHEARING APPARATUS

[75] Inventor: Friedrich W. Elhaus, Moos, Fed. Rep. of Germany

[73] Assignee: Elhaus Industrieanlagen GmbH, Rielasingen, Fed. Rep. of Germany

[21] Appl. No.: 446,043

[22] Filed: Dec. 5, 1989

[30] Foreign Application Priority Data

Dec. 9, 1988 [DE] Fed. Rep. of Germany ....... 3841584

[51] Int. Cl.⁵ .......................... B26D 3/16; B26D 7/02
[52] U.S. Cl. ....................................... 83/198; 83/375; 83/456; 83/567
[58] Field of Search .................. 83/123, 198, 378, 375, 83/455, 456, 369, 372, 639, 567

[56] References Cited

U.S. PATENT DOCUMENTS

| | | | |
|---|---|---|---|
| 2,380,898 | 7/1945 | Pimentel | 164/47 |
| 3,348,441 | 10/1967 | Toney et al. | 83/123 |
| 3,552,253 | 1/1971 | Macdonald | 83/372 |
| 3,886,829 | 6/1975 | Criblez | 83/198 |
| 3,972,257 | 8/1976 | Lazar, Jr. | 83/198 |
| 4,152,959 | 5/1979 | Elhaus | 83/123 |
| 4,846,029 | 7/1989 | Gardner | 83/198 |

FOREIGN PATENT DOCUMENTS 4813024 9/1973 Japan .
4987935 7/1974 Japan .

OTHER PUBLICATIONS

British Patent Application No. A4869GB, Entitled Method of Dividing Logs of Heated Metal into Billets and Apparatus for Use in the Method.

*Primary Examiner*—Douglas D. Watts
*Assistant Examiner*—Scott A. Smith
*Attorney, Agent, or Firm*—Willian Brinks Olds Hofer Gilson & Lione

[57] ABSTRACT

A hot shearing apparatus for shearing heated round or flat section bars of light metal in billets comprises a stationary shearing ring 8 and a movable shearing ring 11. Both shearing rings are divided into shell halves 21, 22 and 31, 32, respectively, and adapted to be spread crosswise in translatory sense. This facilitates the feeding of material and improves the cutting accuracy.

6 Claims, 2 Drawing Sheets

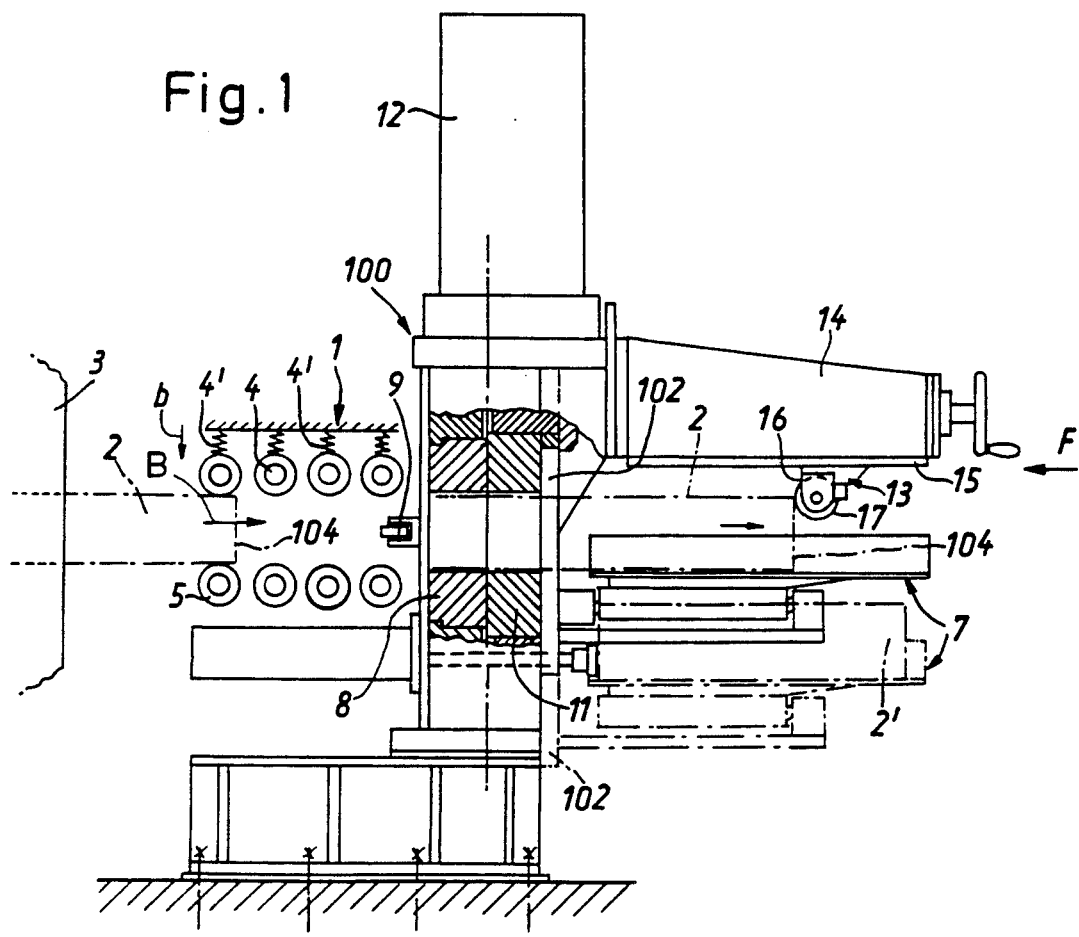

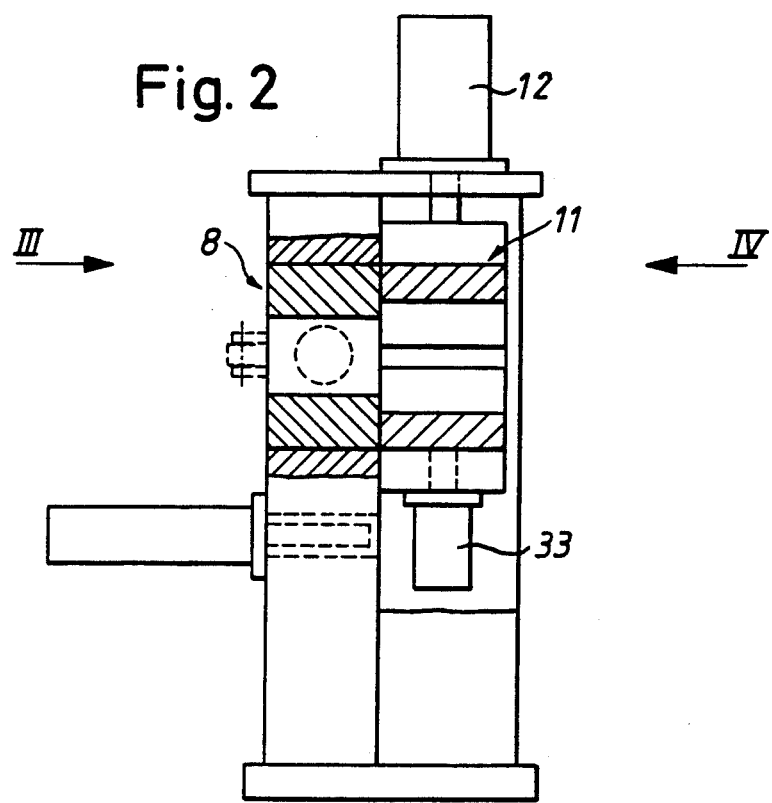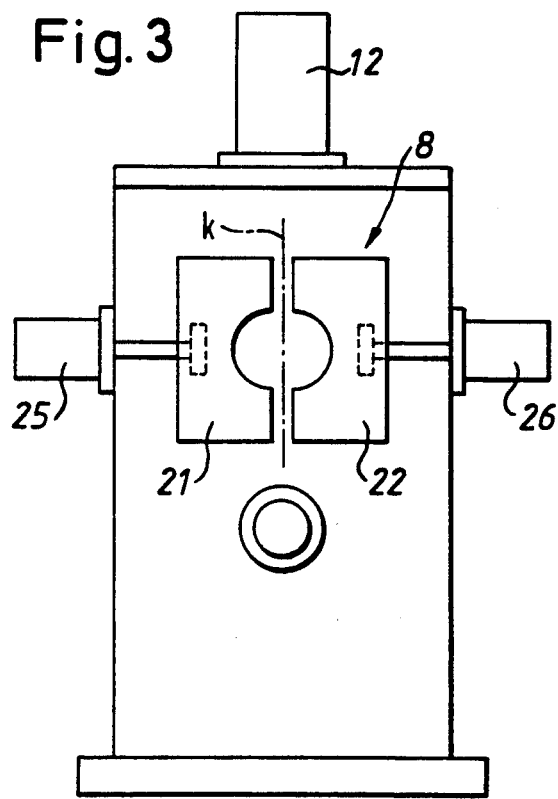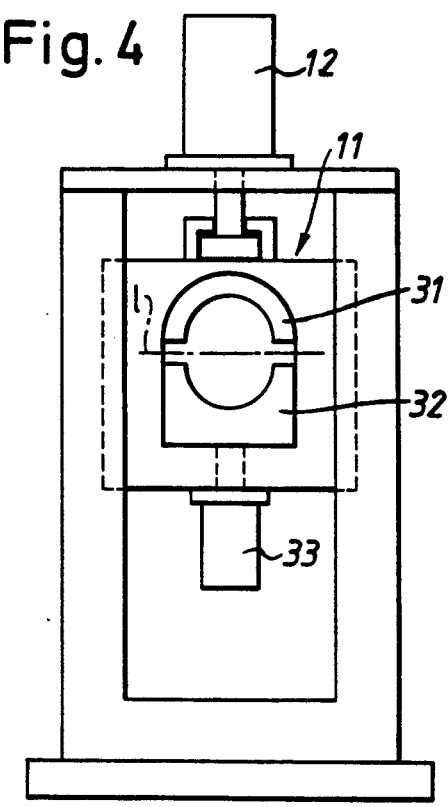

HOT SHEARING APPARATUS

FIELD OF THE INVENTION

The instant invention relates to a hot shearing apparatus for shearing heated round or flat section bars, especially of light metal, in billets, comprising a stationary shearing ring and a movable shearing ring, and a drive means to produce shearing movement of the movable shearing ring, the stationary shearing ring including two shell halves which are adapted to be spread apart in a direction transversely of the shearing movement.

BACKGROUND OF THE INVENTION

A known hot shearing apparatus of the kind in question (U.S. Pat. No. 4,152,959) has the fixed shearing ring capable of being spread transversely of the shearing direction so as to avoid deformation of the front end of the bar in the shearing zone during the shearing process and to facilitate the advancing movement of the bar in the shearing rings.

The diameter of the movable shearing ring is greater than that of the stationary shearing ring in the unspread condition of the same. The spreading of the fixed shearing ring is limited to an extent which corresponds to the inner diameter of the movable shearing ring so as to prevent the bar entering the hot shearing apparatus from hitting against the front end of the movable shearing ring. In the position of maximum spread, the greatest inner diameter of the stationary shearing ring is flush with the bore of the undivided movable shearing ring.

The limitation of the spread to the inner diameter of the movable shearing ring is a disadvantage of this design. It is likewise disadvantageous that after being sheared that part of the bar which is located in the area of the undivided movable shearing ring remains unsupported in the direction of the shearing motion because there is a gap between the shearing ring bore and the surface of the bar. That leads to canting of the bar portion in question and accordingly to an oblique shearing cut.

SUMMARY OF THE INVENTION

It is an object of the invention to design a hot shearing apparatus of the kind defined initially such that the entering of the bar to be cut into the hot shearing apparatus becomes more convenient, even if the bar material supplied should be more or less crooked. It is another object of the invention to provide a hot shearing apparatus of the kind in question with which deformation upon shearing is avoided as well as the resulting inclined cutting.

To meet the objects mentioned, it is provided in accordance with the invention that also the movable shearing ring comprises two shell halves adapted to be spread in a direction which is offset by 90° with respect to the spreading direction of the stationary shearing ring.

With the hot shearing apparatus according to the invention also the movable shearing ring can be spread and such spreading takes place in the direction of the shearing movement, in other words in a direction which is offset by 90° with respect to the spreading of the fixed shearing ring. In other words, the two shearing rings are adapted to be spread "crosswise" with respect to each other. That provides the following advantages:

1. The stationary shearing ring which is adapted to be spread transversely of the shearing direction and to be clamped to the bar prevents any deformation of the front end of the bar during shearing.

2. The stationary shearing ring centers the bar with respect to the movable shearing ring which is adapted to be spread in shearing direction and to be clamped so that the latter can be closed without any problem.

3. The movable shearing ring retains the respective portion of the bar during the shearing process so that the cutting at right angles is improved.

Particularly the advantage mentioned sub 2. is due exclusively to the possibility of "crosswise" spreading of the shearing rings, a possibility which has the further advantage of requiring little structural expenditure.

BRIEF DESCRIPTION OF THE DRAWING

The invention will be described further, by way of example, with reference to the accompanying drawings, in which:

FIG. 1 is a lateral view, partly in section, of a billet hot shearing apparatus according to the invention, the drives to produce the spreading of the two shearing rings being omitted for reasons of clarity;

FIGS. 2 to 4 are one part section and two side elevations as seen in the direction of arrows III and IV, respectively, the drawing representing only those elements of the billet hot shearing apparatus which are essential to the invention.

DESCRIPTION OF THE PREFERRED EMBODIMENT

The billet hot shearing apparatus shown in FIG. 1 comprises a drive unit 1 for conveying rods, bars, or billets 2 from a heater unit 3 through shearing rings 8, 11. The drive unit includes an upper set of drive rollers 4 and a lower set of drive rollers 5, the roller frame which supports the upper set of drive rollers being designed to be pivotal so that it can be moved, for instance, by an hydraulic means (not shown). The drive rollers are supported for horizontal displacement toward either side in the direction of their longitudinal axis. Each of the upper drive rollers is loaded by a spring 4' (arrow b in FIG. 1). A block pusher is adapted to be swung from its rest position next to the drive rollers in the direction between the drive roller sets 4,5 so as to push the billets through the shearing rings 8,11 in the direction of arrow B into a transfer device 7.

Directly behind the drive unit 1 the fixed front shearing ring 8 is firmly supported in the shear housing 100. It is preceded in the direction of movement by lateral guide rollers 9. The front shearing ring 8 is followed by the movable shearing ring 11 which is supported in a shearing ring holder 102 guided for vertical movement at the shear housing 100. The vertical shearing movement is transmitted to the shearing ring holder 102 from an hydraulic system 12, causing the shearing ring 11 to be moved down by way of the shearing ring holder from its position of alignment with the fixed shearing ring 8 into a position shown in discontinuous line in FIG. 1.

It will be realized that the ratio of the diameter to the length of the inner bores of the shearing rings 8,11 is greater than one.

The billet hot shearing apparatus illustrated effects the shearing from above.

It may be taken from FIGS. 2 to 4 that the stationary shearing ring 8 is divided into two shell halves 21 and 22

(FIG. 3) by a vertical separating line k which extends in the shearing direction.

Hydraulic cylinders 25 and 26 are connected laterally to the shell halves 21,22 to spread the shell halves 21,22 of the shearing ring 8 in translatory fashion prior to the transport of the billets through the shearing rings 8,11.

As shown in FIG. 4, the movable shearing ring 11 is subdivided into two shell halves 31,32 by a horizontal separating line l which extends transversely of the shearing direction. The upper shell half 31 is fixed at the housing, while the lower shell half 32 can be spread downwardly by means of an hydraulic cylinder 33. The dividing lines k,l of the two shearing rings 8,11 thus cross each other. When the bar has been pushed through the two spread shearing rings 8, 11 the spreading is eliminated so that the shearing ring 8 which is adapted to be spread transversely of the shearing motion will center the billet in the shearing ring 11, whereby the latter too can be closed without any difficulty. During shearing the movable shearing ring 11 retains the billet while it is being sheared. This improves the cutting at right angles.

It will be understood that while the invention has been shown and described in a preferred from, changes may be made without departing from the true scope of the invention as defined in the following claims.

What is claimed is:

1. A hot shearing apparatus for shearing heated round or flat section bars, especially of light metal, in billets, comprising:
    a stationary shearing ring;
    a moveable shearing ring, and
    a drive means for generating shearing movement of the movable shearing ring,
    wherein the stationary shearing ring is formed by two shell halves arranged such that, when the two shell halves of the stationary shearing ring are in a closed position, the interface between the two shell halves is in a plane containing a diameter of the closed position of the stationary shearing ring,
    said shell halves of the stationary shearing ring being adapted to be spread apart in a direction transversely to the shearing movement of the moveable shearing ring, and
    wherein the moveable shearing ring is formed by two shell halves arranged such that, when the two shell halves of the moveable shearing ring are in a closed position, the interface between the two shell halves is in a plane containing a diameter of the closed position of the moveable shearing ring,
    said shell halves of the moveable shearing ring being adapted to be spread in a direction which is offset by 90° with respect to the spreading direction of the stationary shearing ring.

2. The hot shearing apparatus as claimed in claim 1, wherein spreading drive means acting in opposite directions are associated with the two shell halves of the movable shearing ring.

3. The hot shearing apparatus as claimed in claim 1, wherein only one shell half of the movable shearing ring has a spread drive means, while the other shell half is fixed to the housing.

4. The hot shearing apparatus as claimed in claim 3, wherein shell half of the movable shearing ring below shell half and is equipped with the spread drive means.

5. The hot shearing apparatus as claimed in claim 1, wherein the diameter to length ratio of the shearing rings is greater than one.

6. The hot shearing apparatus as claimed in claim 1, wherein two spread drive means acting in opposite directions are associated with the two shell halves of the stationary shearing ring.

* * * * *

UNITED STATES PATENT AND TRADEMARK OFFICE
CERTIFICATE OF CORRECTION

PATENT NO. : 5,062,336
DATED : November 5, 1991
INVENTOR(S) : Friedrich W. Elhaus It is certified that error appears in the above-indentified patent and that said Letters Patent is hereby corrected as shown below:

Column 4:

In claim 4, line 2 after "ring" insert --is lower than or--.

In claim 4, line 3, after "half" insert --(31)--.

In claim 6, line 2, delete "two".

Signed and Sealed this

Eighteenth Day of October, 1994

Attest:

BRUCE LEHMAN

Attesting Officer    Commissioner of Patents and Trademarks